(12) United States Patent
Gopal et al.

(10) Patent No.: US 10,701,107 B2
(45) Date of Patent: Jun. 30, 2020

(54) DETERMINISTIC LOAD BALANCING OF IPSEC PROCESSING

(71) Applicant: Nicira, Inc., Palo Alto, CA (US)

(72) Inventors: Sushruth Gopal, Sunnyvale, CA (US); Ly Loi, Los Altos, CA (US); Yong Wang, Sunnyvale, CA (US); Michael Parsa, Santa Cruz, CA (US)

(73) Assignee: Nicira, Inc., Palo Alto, CA (US)

( * ) Notice: Subject to any disclaimer, the term of this patent is extended or adjusted under 35 U.S.C. 154(b) by 271 days.

(21) Appl. No.: 15/833,024

(22) Filed: Dec. 6, 2017

(65) Prior Publication Data

US 2019/0173920 A1 Jun. 6, 2019

(51) Int. Cl.
*H04L 29/06* (2006.01)
*G06F 9/50* (2006.01)

(52) U.S. Cl.
CPC .......... *H04L 63/164* (2013.01); *G06F 9/5083* (2013.01); *H04L 63/029* (2013.01); *H04L 63/0272* (2013.01); *H04L 63/0428* (2013.01); *H04L 63/205* (2013.01)

(58) Field of Classification Search
None
See application file for complete search history.

(56) References Cited

U.S. PATENT DOCUMENTS

| | | | | |
|---|---|---|---|---|
| 7,003,118 B1* | 2/2006 | Yang | ................... | H04L 63/0485 370/393 |
| 2012/0254353 A1* | 10/2012 | Baba | ................... | H04L 12/4633 709/217 |
| 2016/0057108 A1* | 2/2016 | Hu | ................... | H04L 47/125 726/15 |
| 2016/0212098 A1* | 7/2016 | Roch | ................... | H04L 63/029 |
| 2016/0352628 A1* | 12/2016 | Reddy | ................... | H04L 45/38 |
| 2017/0063979 A1* | 3/2017 | Saeki | ................... | G06F 13/12 |

* cited by examiner

*Primary Examiner* — Henry Tsang
(74) *Attorney, Agent, or Firm* — Patterson + Sheridan, LLP

(57) ABSTRACT

Certain embodiments described herein are generally directed to deterministic load balancing of processing encapsulated encrypted data packets at a destination tunnel endpoint. In some embodiments, an IPSec component residing within a destination tunnel endpoint is configured to select a CPU core ID of a virtual CPU using a CPU selection function. In some embodiments, the IPSec component selects an SPI value corresponding to the CPU core ID. In some embodiments, the IPsec component indicates the SPI value to a source tunnel endpoint for use in establishing an in-bound security association, wherein the in-bound security association is used by the source tunnel endpoint to encrypt a data packet received from the source endpoint and destined for the destination endpoint.

21 Claims, 3 Drawing Sheets

DETERMINISTIC LOAD BALANCING OF IPSEC PROCESSING

BACKGROUND

IP security protocols are widely used to protect packets communicated between endpoints (EPs), such as over the Internet, between gateways, between data centers (e.g., on premises data centers, cloud data centers, etc.), within data centers, etc. For example, security associations (SAs) may be established between the endpoints. In some embodiments, each security association is a one-way or simplex connection, and therefore at least two security associations, one for each direction, are established between two IPsec peers (e.g., endpoints). These security associations are a form of contract between the endpoints detailing how to exchange and protect information among each other. In some embodiments, each security association is comprised of a mutually agreed-upon key, one or more security protocols, and/or a security parameter index (SPI) value. After security associations have been established between two endpoints, an IPsec protocol may be used to protect data packets for transmission.

For IPsec in the Encapsulating Security Payload (ESP) tunnel mode, tunnel endpoints are used for applying IPsec protocols to encrypt and encapsulate egress packets from a source endpoint and decrypt and decapsulate ingress packets for a destination endpoint to secure communication between the endpoints. For example, a source endpoint may generate and route egress IP packets to a source tunnel endpoint associated with the source endpoint. In particular, the source endpoint may generate an IP packet including a header with the IP address of the source endpoint set as the source IP address and the IP address of the destination endpoint set as the destination IP address. A MAC address of the source tunnel endpoint may further be set as a next-hop MAC address of the IP packet in the header.

The source tunnel endpoint receives the IP packet and encrypts the original IP packet including the header of the original IP packet based on a security association established between the source tunnel endpoint and the destination tunnel endpoint. For example, the source tunnel endpoint encrypts the original IP packet with a mutually agreed-upon key of the security association. The source tunnel endpoint further encapsulates the encrypted packet by adding a new IP header and an ESP header (e.g., including an SPI value corresponding to the security association used to encrypt the packet) to the encrypted packet to generate an encapsulated ESP encrypted data packet. The new IP header includes a source IP address of the source tunnel endpoint and a destination IP address of the destination tunnel endpoint. The new IP header is used to forward the encapsulated ESP encrypted data packet through a network from the source tunnel endpoint to the destination tunnel endpoint.

The destination tunnel endpoint may then decapsulate and decrypt the encapsulated ESP encrypted data packet to extract the original IP packet. For example, the destination tunnel endpoint may determine the security association (e.g., mutually agreed-upon key) to use to decrypt the encapsulated ESP encrypted data packet based on the SPI value included in the ESP header. Based on the destination IP address in the header of the original IP packet, the destination tunnel endpoint forwards the original IP packet to the destination endpoint.

IPsec protocols may be deployed in virtualized computing instances (e.g., a virtual machine (VM) or container) to gain the benefits of virtualization and network functions virtualization (NFV). For example, virtual computing instances may be configured to serve as tunnel endpoints as described. However, use of such IPsec protocols by virtualized computing instances may cause certain other features at the virtualized computing instances to function improperly.

In a virtualized environment, virtual network interface controllers (VNICs) are instantiated in a virtualization layer (also referred to herein as the "hypervisor") supporting such virtualized computing instances and are programmed to behave similarly to physical NICs (PNICs). One feature both PNICs and VNICs have supported is receive side scaling (RSS), which involves computing a hash of incoming packet header attributes and distributing the incoming network traffic across CPUs for processing based on the computed hash values. Packets belonging to the same connection are distributed to the same RSS queue, based on the computed hash value, for processing by a particular CPU. For a VNIC, packets are distributed to virtual RSS queues associated with the VNIC based on the computed hash value. The packets in a virtual RSS queue are processed by a particular virtual CPU associated with the virtual RSS queue.

Traditionally, for a VNIC, RSS is performed for IP packets based on a detected packet type indicated by an IP protocol number in an IP header of the packet that indicates the next higher layer protocol being carried as the IP payload. For example, the VNIC may be configured to perform RSS only for packets of type ICMP, UDP, and TCP, corresponding to IP protocol numbers 1, 6, and 17, respectively. However, for packets encapsulated using ESP tunnel mode, the IP protocol number in the new IP header may be 50. Accordingly, the VNIC may not be configured to perform RSS for received encapsulated ESP encrypted data packets.

Further, the hash computed for selecting a RSS queue is traditionally computed based on the source IP address and destination IP address in the header of the packet. In an encapsulated ESP encrypted data packet, the only available (i.e., non-encrypted) IP addresses for computing the hash are the source IP address of the source tunnel endpoint and the destination IP address of the destination tunnel endpoint. Accordingly, at a VNIC of a destination tunnel endpoint, all encapsulated ESP encrypted data packets received from the same source tunnel endpoint, regardless of the source endpoint that sent the packet and the destination endpoint, would have the same source IP address and destination IP address in the new IP header, and therefore hash to the same value and be assigned to the same virtual RSS queue. Therefore, RSS could not be used to distribute processing of such encapsulated ESP encrypted data packets amongst multiple virtual RSS queues and accordingly multiple virtual CPUs.

In some cases, VNICs may be configured to perform RSS for received encapsulated ESP encrypted data packets. For example, the destination tunnel endpoint's VNIC may be configured to compute a hash of incoming packet header attributes, including an SPI value associated with each packet, and distribute the incoming network traffic across CPUs for processing based on the computed hash values. However, even in such cases, unless there is a very large number (e.g., thousands) of IPSec tunnels (e.g., such that there are many different combinations of source and destination tunnel endpoint IP addresses) or many different security associations (e.g., such that there are many different SPI values, in cases where there is a single IPSec tunnel), it is very unlikely that the RSS performed by the VNIC results in a statistically uniform distribution of packets to virtual CPUs.

SUMMARY

Herein described are one or more embodiments of a method for deterministic load balancing of processing encapsulated encrypted data packets at a destination tunnel endpoint. The method includes initiating, using an IPSec component, an IP Security (IPSec) tunnel creation with a source tunnel endpoint for encrypting data packets communicated between a source endpoint and a destination endpoint. The method further includes selecting, using the IPSec component, a CPU core ID associated with a virtual CPU of a plurality of virtual CPUs. The method further includes selecting, using the IPSec component, an security parameter index (SPI) value corresponding to the CPU core ID. The method further includes indicating, using the IPSec component, the SPI value to the source tunnel endpoint for use in establishing an in-bound security association, wherein the in-bound security association is used by the source tunnel endpoint to encrypt a data packet received by the source endpoint and destined for the destination endpoint.

Also described herein are embodiments of a non-transitory computer readable medium comprising instructions to be executed in a computer system, wherein the instructions when executed in the computer system perform the method described above for deterministic load balancing of processing encapsulated encrypted data packets at a destination tunnel endpoint.

Also described herein are embodiments of a computer system, wherein software for the computer system is programmed to execute the method described above for deterministic load balancing of processing encapsulated encrypted data packets at a destination tunnel endpoint.

Also described herein are embodiments of a computer system comprising means for executing the method described above for deterministic load balancing of processing encapsulated encrypted data packets at a destination tunnel endpoint.

DETAILED DESCRIPTION

Embodiments presented herein relate to systems and methods for deterministic load balancing of processing encapsulated encrypted data packets at a destination tunnel endpoint.

Figure 1:
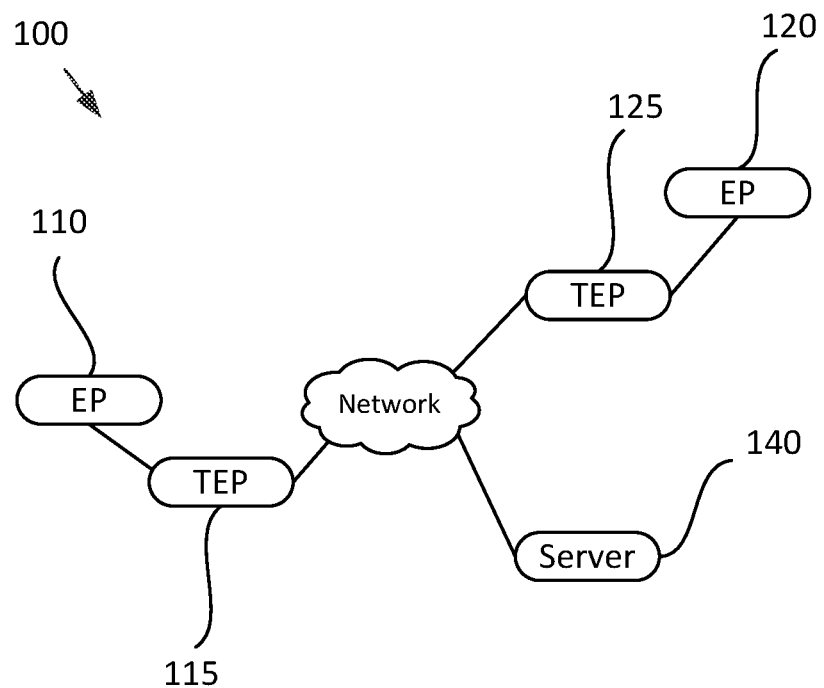
FIG. 1 illustrates an example of a network, in accordance to some embodiments.

FIG. 1 illustrates an example of a network 100, representing a physical network. As shown by FIG. 1, network 100 connects a plurality of tunnel endpoints (TEPs), including TEP 115 and TEP 125, and a server 140. A TEP may be a physical computing device (e.g., physical server, physical host). In certain embodiments, a TEP may be a virtualized computing instance as further discussed herein.

TEPs 115 and 125 may connect endpoints (EPs), including EP 110 and EP 120, in a logical overlay network. An EP refers generally to an originating EP ("source EP") or terminating EP ("destination EP") of a flow of network packets, which can include one or more data packets passed from the source to the destination EP. In practice, an EP may be a physical computing device (e.g., physical server, physical host). In certain embodiments, an EP may be a virtualized computing instance (e.g., virtual machine, container, data compute node, isolated user space instance) as further discussed herein.

In network 100, EPs may communicate with or transmit data packets to other EPs via tunnel endpoints (TEPs) as discussed. EP 110 may transmit a data packet to EP 120 in a secured fashion via TEPs 115 and 125, acting as a source TEP and a destination TEP, respectively. TEPs 115 and 125 may implement IPsec protocols, including ESP tunnel mode, to secure communication between one another. In some embodiments, before any data can be securely transferred between EPs 110 and 120 using the IPsec framework, security associations (e.g., including a mutually agreed-upon key, one or more security protocols, and/or a SPI value) may need to be established between EPs 1120 and 120. In some embodiments, the security associations may be established by TEPs 115 and 125 on behalf of EPs 110 and 120.

The mutually agreed-upon key (e.g., encryption/decryption key), in some embodiments, is generated by a server (e.g., server 140) and subsequently distributed to TEPs 115 and 125 associated with the EPs 110 and 120. The one or more security protocols, described above, may be one or more IPsec security protocols such as Authentication Header (AH), Encapsulating Security Payload (ESP), etc. After security associations have been established for the two EPs 110 and 120, one or more of these security protocols may be used to protect data packets for transmission. Though certain embodiments are described herein with respect to the ESP security protocol, other suitable IPsec security protocols (e.g., AH protocol) alone or in combination with ESP, may be used in accordance with the embodiments described herein. Further, the embodiments described herein may similarly be used for different types of traffic such as IPv4, IPv6, etc. In certain embodiments, the techniques herein can be used to hash ESP packets encapsulated in other packet types (e.g., VXLAN or Geneve).

In addition to a mutually agreed-upon key and security protocol, a security association includes an SPI value. In some embodiments, each SPI value is a binary value associated with a security association, which enables a TEP to distinguish among multiple active security associations. As an example, SPI values may be used to distinguish between the inbound and outbound security associations of different EPs. In some cases, the Internet Key Exchange (IKE) protocol is used to generate these SPI values and encryption/decryption keys in the IPsec framework. For example, prior to any data exchange, IKE performs a two-phase negotiation session, which results in establishing two security associations between two IPsec peers (e.g., TEPs). These security associations may not only contain mutually agreed-upon encryption and decryption keys to be used for incoming and outgoing traffic (e.g., of an EP), but also maintain sequence numbers for each data transfer. These sequence numbers are maintained to ensure anti-replay, which prevents hackers from injecting or making changes in data packets that travel from a source to a destination TEP.

In some cases, instead of using IKE, distributed network encryption (DNE) may be utilized to simplify key management, including key generation and exchange, and SPI allocation. DNE provides a central unit, e.g. server 140, that generates and distributes encryption/decryption keys and SPI values for EPs to TEPs in a network. DNE also simplifies protecting network traffic of TEPs by allowing users (e.g., network administrators) to define simple security rules and key policies. For example, in some embodiments, server 140 may store, in its memory, a plurality of security rules and key policies. Security rules may be user-defined rules that users input into the central unit through an interface (e.g., via a manager, which may be a physical computing device or a virtualized computing instance supported by a physical computing device). Security rules may define what key policy is used by server 140 to generate an encryption/decryption key for data transfer between TEPs for EPs in a network. In some embodiments, each key policy may be associated with one or more EPs and include certain specifications (e.g., one or more of an algorithm, action, strength of the key, etc.) that define properties of an encryption/decryption key.

Figure 2:
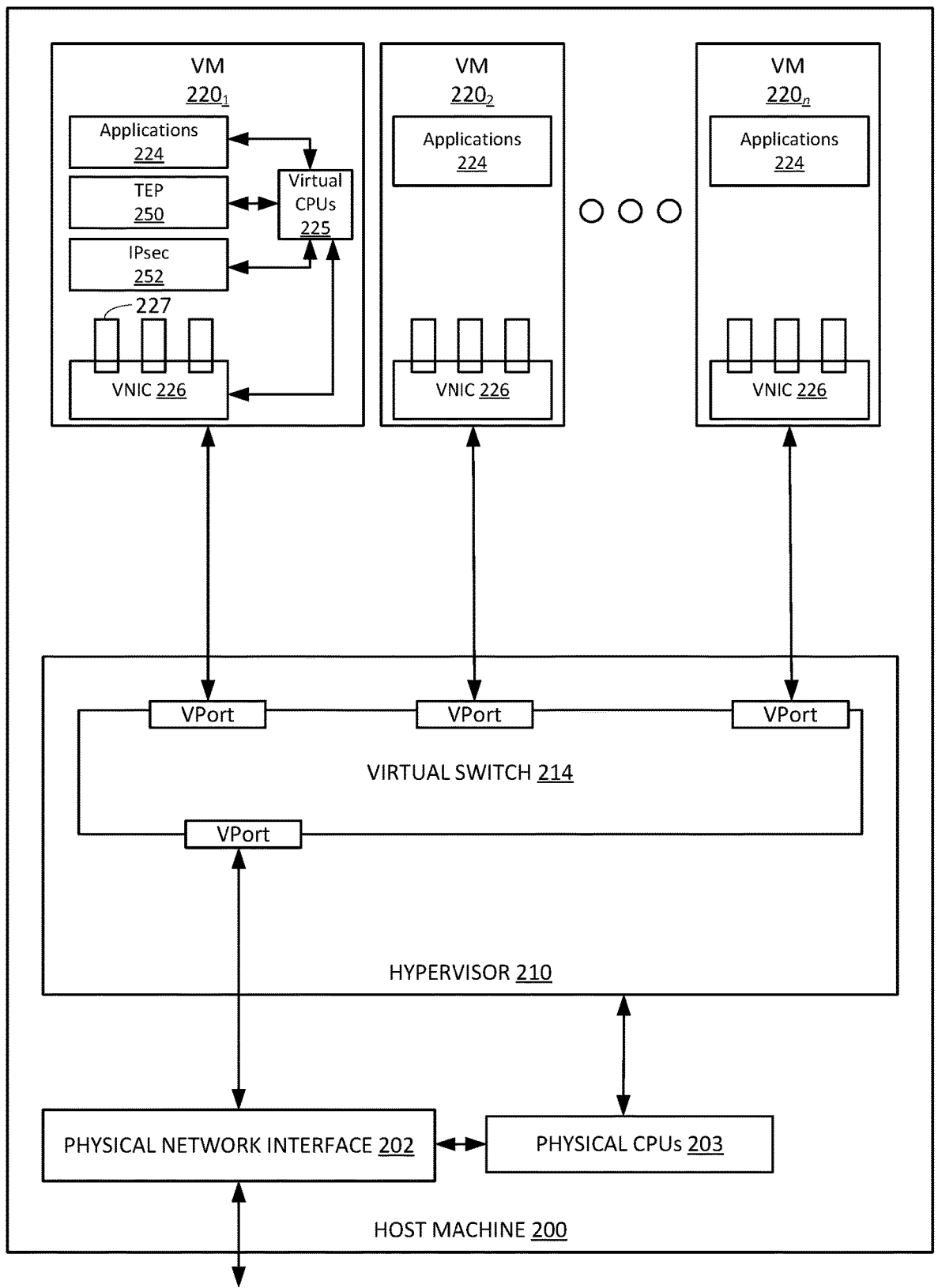
FIG. 2 illustrates an example block diagram of host machine for use in a virtualized network environment, according to some embodiments.

FIG. 2 illustrates an example block diagram of host machine 200 for use in a virtualized network environment, according to some embodiments. As illustrated, host machine 200 includes a physical network interface controller (PNIC) 202, a hypervisor 210, and a plurality of virtual machines $220_1, 220_2, \ldots 220_n$.

Host machine 200 may provide part of the computing infrastructure in a virtualized computing environment distributed among multiple host machines. Though certain embodiments are described herein with respect to VMs, the same principals and techniques may also apply to other appropriate virtual computing instances (e.g., virtual machine, container, data compute node, isolated user space instance). In certain embodiments, host machine 200 is a physical general purpose computer (e.g., a server, workstation, etc.) and includes one or more physical central processing units (CPUs) 203. Although not shown, in addition to physical CPUs 203, host machine 200 may also include a system memory, and non-volatile data storage, in addition to one or more physical network interfaces, such as PNIC 202, for communicating with other hardware computing platforms, entities, or host machines on a physical network accessible through PNIC 202.

Hypervisor 210 serves as an interface between virtual machines 220 and PNIC 202, as well as other physical resources (including physical CPUs 203) available on host machine 200. Each VM 220 is shown including a virtual network interface card (VNIC) 226, which is responsible for exchanging packets between VM 220 and hypervisor 210. Though shown as included in VMs 220, it should be understood that VNICs 226 may be implemented by code (e.g., VM monitor code) associated with hypervisor 210. VNICs 226 may be, in some cases, a software implementation of a physical network interface card. Each VM 220 is connected to a virtual port (vport) provided by virtual switch 214 through the VM's associated VNIC 226. Virtual switch 214 may serve as physical network switch, i.e., serve as an edge device on the physical network, but implemented in software. Virtual switch 214 is connected to PNIC 202 to allow network traffic to be exchanged between VMs 220 executing on host machine 200 and destinations on an external physical network.

In certain embodiments, each VNIC 226 may be configured to perform RSS. Accordingly, each VNIC 226 may be associated with a plurality of software based VNIC RSS queues 227 on machine VM 220. Each of the VNIC RSS queues 227 may be associated with a virtual CPU (e.g., a different virtual CPU) from one or more virtual CPUs 225. As described in U.S. Patent Application Publication 2016/0085571, which is incorporated herein by reference, a virtual CPU may correspond to different resources (e.g., physical CPU or execution core, time slots, compute cycles, etc.) of one or more physical CPUs 203 of host machine 200. When receiving incoming packets (e.g., not including encapsulated ESP encrypted packets), VNIC 226 may compute a hash value based on header attributes of the incoming packets and distribute the incoming packets among the VNIC RSS queues 227 associated with VNIC 226. For example, different hash values may be mapped to different VNIC RSS queues 227. The incoming packets stored in each VNIC RSS queue 227 are then processed by the corresponding virtual CPU 225 associated with the VNIC RSS queue 227. Once a virtual CPU 225 is selected for processing an incoming packet stored in a certain VNIC RSS queue 227, the selected virtual CPU 225 begins running an interrupt handler invoked by the kernel in response to an interrupt issued by VNIC 226. The selected virtual CPU 225 then continues with further processing the packet by performing protocol processing (unless another virtual CPU is selected, by a higher level packet steering module (e.g., Receive Packet Steering (RPS)) to handle the protocol processing).

Accordingly, using RSS, no single virtual CPU 225 is loaded with processing all incoming packets for VNIC 226. In addition, the processing of packets is distributed to different virtual CPUs 225 at the VNIC 226 and at the beginning of the processing pipeline for the packets, therefore taking advantage of distributed processing of packets at an early stage in the processing pipeline.

In some embodiments, a VM 220 is configured to perform the functions of a TEP. For example, VM $220_1$ may be configured as a TEP and include a TEP component 250 to implement TEP functions. VM $220_1$ may also be configured to implement IPsec protocols and functionality using an IPsec component 252. Further, another VM 220 may be configured as an EP associated with VM $220_1$. For example, VM $220_2$ may be an EP associated with the TEP VM $220_1$. Accordingly, in some embodiments, another source EP may generate an IP packet to send to VM $220_2$. The source EP may forward the IP packet to a source TEP, which encrypts (e.g., using an IPsec component 252) and encapsulates (e.g., using a TEP component 250) the packet using an IPsec protocol (e.g., ESP tunnel mode) to generate an encapsulated ESP encrypted data packet. The source TEP then sends the encapsulated ESP encrypted data packet to destination TEP VM $220_1$. The encapsulated ESP encrypted data packet is, therefore, received at virtual switch 214 of host machine 200 via PNIC 202. Virtual switch 214 sends the encapsulated ESP encrypted data packet to VNIC 226 of VM $220_1$.

As further described above, VNICs may be configured to perform RSS for received encapsulated ESP encrypted data packets based on the packets' SPI values. For example, VNIC 226 of VM $220_1$ receives an encapsulated ESP encrypted data packet, as described above. VNIC 226 then generates (e.g., computes) a hash value (e.g., CPU core ID) based at least in part on an SPI value included in the ESP header of the encapsulated ESP encrypted data packet. For example, VNIC 226 identifies the encapsulated ESP encrypted data packet as an ESP packet based on an IP protocol number in the header of the packet indicating it is an ESP packet (e.g., equal to 50), and therefore calculates the hash value based at least in part on the SPI value. As discussed, each security association for a pair of EPs may have a different associated SPI value. For example, destination TEP VM $220_1$ may use a first security association for packets sent from a first source EP via a source TEP for VM $220_2$, and a second security association for packets sent from a second source EP via the same source TEP for VM $220_2$. Accordingly, even though encapsulated ESP encrypted data packets may be received at destination TEP VM $220_1$ from the same source TEP and therefore have the same source and destination IP addresses in the new header of each of the encapsulated ESP encrypted data packets, different hash values may be calculated for the packets based at least in part on the different SPI values. In some embodiments, the hash value is further computed based on the source and/or destination IP addresses in the new header, such as to add further entropy to the hash value calculation. Subsequently, VNIC 226 assigns the encapsulated ESP encrypted data packet to one of the plurality of VNIC RSS queues 227 based on the generated hash value.

However, as described above, even if the VNIC is configured to perform RSS for received encapsulated ESP encrypted data packets, e.g., by taking into account the packets' SPI values when computing hash values, it is very unlikely that a statistically uniform distribution of packets to virtual CPUs results from the RSS. For example, VNIC 226 may receive, from a single source TEP, encapsulated ESP encrypted packets with four different SPI values, each associated with a different security association established between a source EP in the physical network and a destination EP (e.g., VM $220_2$) residing on host machine 200. However, the hash algorithm that is used by VNIC 226 may be configured such that the same hash value may be generated for all or most of the SPI values, which results in all or most of the packets being assigned to the same RSS queue 227. As a result, configuring a VNIC 226 to perform RSS for encapsulated ESP encrypted data packets based on the packets' SPI values does not guarantee a fair and even distribution of the packets among virtual CPUs 225 unless there is a very large number of IPSec tunnels or many different security associations.

Figures 3, 4:
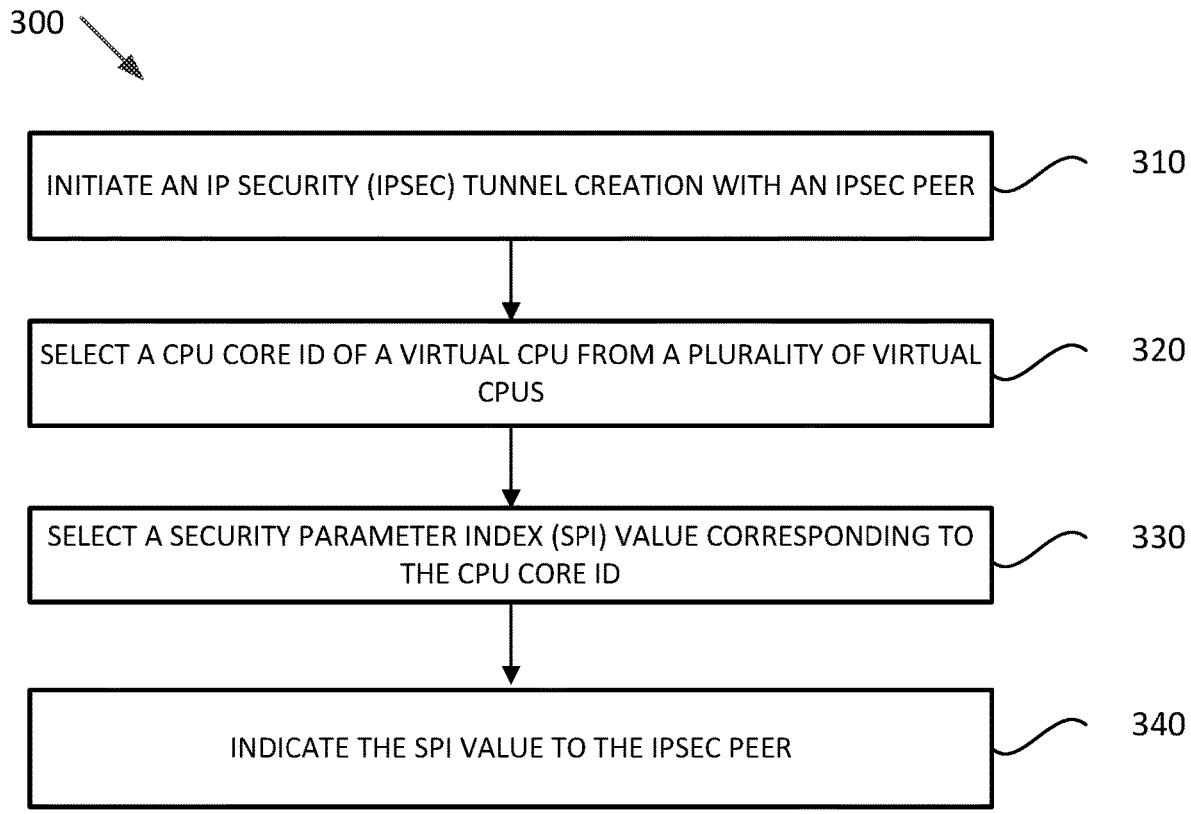
FIG. 3 illustrates a example operations for use by a destination tunnel endpoint for establishing an IPSec tunnel with an IPsec peer, according to some embodiments.
FIG. 4 illustrates an example mapping of different groups of SPI values to different CPU core IDs, according to some embodiments.

Accordingly, FIG. 3 illustrates example operations 300 for use by IPSec component 252 residing in destination TEP VM $220_1$ to enable deterministic load balancing of IPSec processing, in accordance with some embodiments.

At 310, IPSec 252 initiates IPSec tunnel creation with an IPSec component (with the same or similar capabilities as IPSec 252) residing in an IPSec peer. In some embodiments, IPSec tunnel creation initiation may be triggered when network traffic is flagged for protection according to an IPSec security policy configured in the IPSec peers, such as TEP VM $220_1$ (e.g., TEP 125) and another TEP (e.g., TEP 115) in the physical network. For example, TEP VM $220_1$ may receive data packets flagged for protection from VM $220_2$ (e.g., EP 120), which may be an EP associated with the TEP VM $220_1$. The data packets may be destined for another EP (e.g., EP 110), for example, in the physical network. As a result, IPSec 252, residing in TEP VM $220_1$, engages in IPSec tunnel initiation with an IPSec component residing in another TEP (e.g., TEP 115) for any data packets intended to be communicated between VM $220_2$ (e.g., EP 120) and the other EP (e.g., EP 115).

Once the tunnel creation starts, the two IPSec peers (e.g., TEP VM $220_1$ and the other TEP (e.g., TEP 115)) begin the two-phase Internet Key Exchange (IKE) process, as described above. During IKE Phase I, the two IPSec peers authenticate and establish a secure channel between themselves to enable IKE Phase II. Once a secure channel between the two IPSec peers is established, the IPSec peers negotiate and establish two unidirectional IPSec security associations for communication between the source and destination EPs (VM $220_2$ (e.g., EP 120) and EP 110, respectively). As described above, each security association includes a unique SPI value for enabling the IPSec peers to distinguish between security associations. For example, one security association (referred to as an "in-bound security association" in the embodiments described herein) may be established for encrypting data packets transmitted by EP 110 and destined for EP 120 (e.g., VM $220_2$) while another security association ("outbound security association") may be established for encrypting data packets transmitted by EP 120 and destined for EP 110.

At 320, IPSec 252 selects a CPU core ID of a virtual CPU from a plurality of virtual CPUs 225. For example, IPSec 252 may be configured to select the CPU core ID of one of virtual CPUs 225 to process all the future incoming encapsulated ESP encrypted packets transmitted by the source EP (e.g., EP 110) via the IPSec peer (e.g., TEP 115). In some embodiments, when selecting a virtual CPU, IPSec 252 utilizes a CPU selection function that is configured to enable a more even distribution of the load level being handled by virtual CPUs 225. Accordingly, in some embodiments, the CPU selection function may be configured to make a selection based on the level of load being handled by each one of virtual CPUs 225. As an example, VM $220_1$ may include four virtual CPUs 225, each of which may be handling varying amounts of load levels. In such an example, the CPU selection function takes the amount of load being handled by each of the virtual CPUs 225, as input, and generates the core ID of one of the virtual CPUs 225. In some embodiments, the CPU selection function may be configured to generate the core ID of a virtual CPU that is handling the least amount of general network traffic. In some embodiments, the CPU selection function may be configured to generate the core ID of a virtual CPU that is handling the least amount of ESP encrypted data packets.

At 330, IPSec 252 selects an SPI value corresponding to the CPU core ID selected at step 320. As described above, VNIC 226 may be configured with a hash algorithm to perform RSS for received encapsulated ESP encrypted data packets based on the packets' corresponding SPI values. As further described above, unless there is a very large number of IPSec tunnels or many different security associations, the hash algorithm may hash incoming encapsulated ESP encrypted data packets to only a few of the virtual CPUs 225 resulting in a non-uniform distribution of the packets among virtual CPUs 225. However, using the hash algorithm, IPSec 252 may determine which SPI values hash to which CPU core IDs (i.e., hash values), based on which, IPSec 252 may select and dictate SPI values to IPSec peers when establishing security associations with the goal of load balancing virtual CPUs 225.

For example, in some embodiments, after selecting the CPU core ID at step 320, IPSec 252 generates an SPI value for an in-bound security association between the source EP and destination EP (e.g., EP 110 and EP 120, respectively). The in-bound security association is used to encrypt packets transmitted by the source endpoint (e.g., EP 110) and destined for VM $220_2$ (e.g., EP 120). In such embodiments, IPSec 252 uses VNIC 226's RSS hash algorithm to determine which CPU core ID the generated SPI value hashes to. If the generated SPI value hashes to the CPU core ID selected at step 320, IPSec 252 proceeds to use the generated SPI value for the in-bound security association being established, as further described in relation to step 340. If the generated SPI value hashes to a CPU core ID other than the CPU core ID selected at step 320, then IPSec 252 generates a second SPI value and uses the hash algorithm again to determine if the second SPI value hashes to the CPU core ID selected at step 320. If the second SPI value hashes to the CPU core ID selected at step 320, IPSec 252 proceeds to use the generated SPI value for the in-bound security association. If not, IPSec 252 continues to generate additional SPI values in the same manner until an SPI value that hashes to the CPU core ID, selected at step 320, is found.

In some embodiments, prior to engaging in tunnel creation with any IPSec peers, IPSec 252 generates a plurality of SPI values and runs all the generated SPI values through the hash algorithm, which provides IPSec 252 with a mapping of the plurality of SPI values to different CPU core IDs. Using this mapping, IPSec 252 is able to select an SPI value that corresponds to, for example, the CPU core ID selected at step 320. FIG. 4 illustrates an example mapping that may result from IPSec 252 generating and running a plurality of SPI values through VNIC 226's RSS hash algorithm.

For example, virtual CPUs 225 may comprise virtual CPU (1) to virtual CPU (n), having CPU core ID (1) to CPU core ID (n), respectively. Having run the plurality of generated SPI values through the hash algorithm, a number of SPI values may be mapped to each of the CPU core IDs. For example, SPI list (1), including a number of SPI values, may be mapped to core ID (1), while SPI list (2) may be mapped to core ID (2), etc. After the CPU core ID is selected at step 320, IPSec 252 then refers to the mapping (e.g., mapping table of FIG. 4) to select an SPI value from an SPI list corresponding to the selected CPU core ID. For example, IPSec 252 may select CPU core ID (3) at step 320, in which case, at step 330, IPSec 252 selects an SPI value from SPI list (3).

In one example, one or more SPI lists in FIG. 4 may, for example, include no SPI values. This is because, in such an example, the hash algorithm has hashed all the plurality of generated SPI values to CPU core IDs corresponding to other SPI lists. For example, IPSec 252 may generate a plurality of SPI values that may hash to CPU core IDs (2)-(4). In other words, no SPI values from the plurality of SPI values may hash to CPU core ID 1. In such an example, if IPSec 252 selects CPU core ID (1) at step 320, IPSec is not able to find an SPI value that has hashed to CPU core ID (1). As a result, in some embodiments, after determining that no SPI values are hashed to CPU core ID (1), IPSec 252 may generate and hash more SPI values, using the hash algorithm, until one or more SPI values are hashed to CPU core ID (1).

In some embodiments, IPSec 252 is configured such that each SPI value that it generates, either during or prior the IPSec tunnel creation, is unique. In some embodiments, IPSec 252 may maintain a database of SPI values (e.g., in VM 220₁'s memory) that it has already generated. In such embodiments, after generating an SPI value, IPSec 252 may perform a look-up of the SPI database to ensure that the generated SPI value is unique. If not, IPSec 252 may generate subsequent SPI values until a unique SPI value is generated.

Referring back to FIG. 3, at step 340, IPSec 252 residing in VM 220₁ (e.g., TEP 125) indicates the SPI value selected at step 330 to the IPSec component residing in the IPSec peer (e.g., TEP 115) for use in an in-bound security association utilized to encrypt data packets transmitted by the source EP (e.g., EP 110) and destined for destination EP (e.g., EP 120). After the security association is established with the selected SPI value, the IPSec component residing in the IPSec peer (e.g., TEP 115) encrypts any packets received from the source EP (e.g., EP 110) and destined for the destination EP (e.g., EP 120) using the in-bound security association and the selected SPI value. Once the encapsulated ESP encrypted data packets arrive at VNIC 226 of VM 220₁ (e.g., TEP 125), VNIC 226 performs RSS using its hash algorithm, which results in the encapsulated ESP encrypted data packets being hashed to the CPU core ID that was selected at step 320. Based on the CPU core ID, VNIC 226 assigns the encapsulated ESP encrypted data packets to one of the plurality of VNIC RSS queues 227 that corresponds to the virtual CPU whose CPU core ID was selected at step 320. The virtual CPU then processes the encapsulated ESP encrypted data packet. For example, the virtual CPU is used to decapsulate (e.g., using TEP component 250) and decrypt (e.g., using IPsec component 252) the packet. The original IP packet is then sent to virtual switch 214, which forwards the packet to VM 220₂ (e.g., EP 120).

By utilizing the operations described above in relation to FIG. 3, IPSec 252 is able to deterministically select a virtual CPU for processing encapsulated ESP encrypted packets associated with a certain in-bound security association (e.g., a certain pair of source and destination EPs). This also ensures that encapsulated ESP encrypted packets from the same flow are not processed out of order because they all include the same SPI value in their headers and, therefore, are hashed to and processed by the same virtual CPU.

It is important to note that, typically, to add an extra level of security, the IPSec framework may require that security associations between EPs change periodically (e.g., after a certain amount of time, after a certain amount of data has been exchanged, etc.), meaning that the SPI values associated with the changing security associations change periodically as well. In such situations, after determining that an SPI value associated with a certain security association needs to be changed, IPSec 252 may undergo operations 330-340 again, which entail selecting a new SPI value (different than the SPI value selected for the previous security association being replaced) that hashes to the same CPU core ID associated with the same virtual CPU has been processing packets encrypted by the previous security association. Using the new SPI value, a new security association is then established between the IPSec peers.

In some embodiments, instead of performing IKE with an IPSec peer when engaging in IPSec tunnel creation, IPSec 252 may receive an encryption/decryption key as well as an SPI value from a DNE controller (e.g., server 140). For example, the DNE controller may perform the selection of the CPU core ID as well as a corresponding SPI value for VM 220₁ (e.g., TEP 125), as described above in relation to steps 320-350 of FIG. 3, and subsequently transmit the SPI value to both VM 220₁ (TEP 125) and TEP 115 for use in establishing the in-bound security association utilized for encrypting packets transmitted from EP 110 to EP 120. For example, in some embodiments, the DNE controller has access to or stores the RSS hash algorithm, used by VNIC 226 of VM 220₁ (TEP 125), which the DNE controller is able to use to generate mappings of SPI values to CPU core IDs, as described above in step 330 of FIG. 3. In some embodiments, the DNE controller may also have access to information that enables the DNE controller to select CPU core IDs. For example, the DNE controller may receive information about the level of load each virtual CPU of virtual CPUs 225 is handling, based on which the DNE controller may use a CPU selection function to select a CPU core ID, as described above in step 330 of FIG. 3

In host machine 200, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a floppy disk, flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory.

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for deterministic load balancing of processing encapsulated encrypted data packets at a destination tunnel endpoint running in a destination host machine, comprising:
    establishing an IPSec tunnel between a source tunnel endpoint and the destination tunnel endpoint;
    selecting, by the destination tunnel endpoint, a CPU core ID associated with a virtual CPU of a plurality of virtual CPUs of the destination tunnel endpoint;
    selecting, by the destination tunnel endpoint, a security parameter index (SPI) value corresponding to the CPU core ID, the selecting the SPI value comprising:
        generating a first SPI value;
        running the first SPI value through a receive side scaling (RSS) hash algorithm used by a virtual network interface card (VNIC) of the destination tunnel endpoint; and
        selecting the first SPI value as the SPI value upon determining that the running resulted in the CPU core ID; and
    indicating, by the destination tunnel endpoint, the SPI value to the source tunnel endpoint for use in establishing an in-bound security association, wherein the in-bound security association is used by the source tunnel endpoint to encrypt a data packet received from a source endpoint and destined for a destination endpoint.

2. The method of claim 1, wherein the method further comprises:
    receiving, using the VNIC, the encrypted data packet, the encrypted data packet comprising a first header and an encrypted payload, the first header comprising a source IP address of the source tunnel endpoint, a destination IP address of the destination tunnel endpoint, and the SPI value corresponding to the in-bound security association between the source endpoint and the destination endpoint, the encrypted payload comprising a second header comprising a source IP address of the source endpoint and a destination IP address of the destination endpoint;
    calculating, using the VNIC, the CPU core ID based at least in part on the SPI value;
    assigning, using the VNIC, the encrypted data packet to a VNIC RSS queue of a plurality of VNIC RSS queues associated with the VNIC based on the CPU core ID, wherein the VNIC RSS queue corresponds to the virtual CPU; and
    processing, using the virtual CPU, the encrypted data packet.

3. The method of claim 1, wherein the selecting the SPI value further comprises:
    generating a second SPI value upon determining that the running did not result in the CPU core ID;
    running the second SPI value through the RSS hash algorithm used by the VNIC of the destination tunnel endpoint; and
    selecting the second SPI value as the SPI value upon determining that the running resulted in the CPU core ID.

4. The method of claim 1, wherein the selecting the SPI value further comprises:
    generating a plurality of SPI values, wherein generating the plurality of SPI values includes generating the first SPI value;
    running the plurality of SPI values through the RSS hash algorithm resulting in a mapping of the plurality of SPI values to a number of CPU core IDs including the CPU core ID, wherein running the plurality of SPI values through the RSS hash algorithm includes running the first SPI value through the RSS hash algorithm, and wherein the mapping includes a mapping of the first SPI value to the CPU core ID; and
    selecting the SPI value corresponding to the CPU core ID based on the mapping, wherein selecting the SPI value corresponding to the CPU core ID based on the mapping includes selecting the first SPI value as the SPI value upon determining that the running resulted in the CPU core ID based on the mapping of the first SPI value to the CPU core ID.

5. The method of claim 1, wherein the selecting the CPU core ID further comprises using a CPU selection function.

6. The method of claim 5, wherein the CPU selection function uses a load level of each of the plurality of virtual CPUs as input.

7. The method of claim 6, wherein a load level of the virtual CPU is lowest among load levels of the plurality of virtual CPUs.

8. A non-transitory computer readable medium comprising instructions to be executed in a computer system, wherein the instructions when executed in the computer system perform a method for deterministic load balancing of processing encapsulated encrypted data packets at a destination tunnel endpoint running in the computer system, the method comprising:
    establishing an IPSec tunnel between a source tunnel endpoint and the destination tunnel endpoint;
    selecting, by the destination tunnel endpoint, a CPU core ID associated with a virtual CPU of a plurality of virtual CPUs of the destination tunnel endpoint;
    selecting, by the destination tunnel endpoint, a security parameter index (SPI) value corresponding to the CPU core ID, the selecting the SPI value comprising:
        generating a first SPI value;
        running the first SPI value through a receive side scaling (RSS) hash algorithm used by a virtual network interface card (VNIC) of the destination tunnel endpoint; and
        selecting the first SPI value as the SPI value upon determining that the running resulted in the CPU core ID; and
    indicating, by the destination tunnel endpoint, the SPI value to the source tunnel endpoint for use in establishing an in-bound security association, wherein the in-bound security association is used by the source tunnel endpoint to encrypt a data packet received from a source endpoint and destined for a destination endpoint.

9. The non-transitory computer readable medium of claim 8, wherein the method further comprises:
    receiving, using the vnic, the encrypted data packet, the encrypted data packet comprising a first header and an encrypted payload, the first header comprising a source IP address of the source tunnel endpoint, a destination IP address of the destination tunnel endpoint, and the SPI value corresponding to the in-bound security association between the source endpoint and the destination endpoint, the encrypted payload comprising a second header comprising a source IP address of the source endpoint and a destination IP address of the destination endpoint;

calculating, using the VNIC, the CPU core ID based at least in part on the SPI value;

assigning, using the VNIC, the encrypted data packet to a VNIC RSS queue of a plurality of VNIC RSS queues associated with the VNIC based on the CPU core ID, wherein the VNIC RSS queue corresponds to the virtual CPU; and processing, using the virtual CPU, the encrypted data packet.

10. The non-transitory computer readable medium of claim 8, wherein the selecting the SPI value further comprises:

generating a second SPI value upon determining that the running did not result in the CPU core ID;

running the second SPI value through the RSS hash algorithm used by the VNIC of the destination tunnel endpoint; and selecting the second SPI value as the SPI value upon determining that the running resulted in the CPU core ID.

11. The non-transitory computer readable medium of claim 8, wherein the selecting the SPI value further comprises:

generating a plurality of SPI values, wherein generating the plurality of SPI values includes generating the first SPI value;

running the plurality of SPI values through the RSS hash algorithm resulting in a mapping of the plurality of SPI values to a number of CPU core IDs including the CPU core ID, wherein running the plurality of SPI values through the RSS hash algorithm includes running the first SPI value through the RSS hash algorithm, and wherein the mapping includes a mapping of the first SPI value to the CPU core ID; and selecting the SPI value corresponding to the CPU core ID based on the mapping, wherein selecting the SPI value corresponding to the CPU core ID based on the mapping includes selecting the first SPI value as the SPI value upon determining that the running resulted in the CPU core ID based on the mapping of the first SPI value to the CPU core ID.

12. The non-transitory computer readable medium of claim 8, wherein the selecting the CPU core ID further comprises using a CPU selection function.

13. The non-transitory computer readable medium of claim 12, wherein the CPU selection function uses a load level of each of the plurality of virtual CPUs as input.

14. The non-transitory computer readable medium of claim 13, wherein a load level of the virtual CPU is lowest among load levels of the plurality of virtual CPUs.

15. A computer system, comprising:

a memory comprising executable instructions; and a processor in data communication with the memory and configured to execute the instructions to cause the computer system to perform a method for deterministic load balancing of processing encapsulated encrypted data packets at a destination tunnel endpoint running in the computer system, the method comprising:

establishing an IPSec tunnel between a source tunnel endpoint and the destination tunnel endpoint;

selecting, by the destination tunnel endpoint, a CPU core ID associated with a virtual CPU of a plurality of virtual CPUs of the destination tunnel endpoint;

selecting, by the destination tunnel endpoint, a security parameter index (SPI) value corresponding to the CPU core ID, the selecting the SPI value comprising:

generating a first SPI value;

running the first SPI value through a receive side scaling (RSS) hash algorithm used by a virtual network interface card (VNIC) of the destination tunnel endpoint; and selecting the first SPI value as the SPI value upon determining that the running resulted in the CPU core ID; and indicating, by the destination tunnel endpoint, the SPI value to the source tunnel endpoint for use in establishing an in-bound security association, wherein the in-bound security association is used by the source tunnel endpoint to encrypt a data packet received from a source endpoint and destined for a destination endpoint.

16. The computer system of claim 15, wherein the method further comprises:

receiving, using the VNIC, the encrypted data packet, the encrypted data packet comprising a first header and an encrypted payload, the first header comprising a source IP address of the source tunnel endpoint, a destination IP address of the destination tunnel endpoint, and the SPI value corresponding to the in-bound security association between the source endpoint and the destination endpoint, the encrypted payload comprising a second header comprising a source IP address of the source endpoint and a destination IP address of the destination endpoint;

calculating, using the VNIC, the CPU core ID based at least in part on the SPI value;

assigning, using the VNIC, the encrypted data packet to a VNIC RSS queue of a plurality of VNIC RSS queues associated with the VNIC based on the CPU core ID, wherein the VNIC RSS queue corresponds to the virtual CPU; and processing, using the virtual CPU, the encrypted data packet.

17. The computer system of claim 15, wherein the selecting the SPI value further comprises:

generating a second SPI value upon determining that the running did not result in the CPU core ID;

running the second SPI value through the RSS hash algorithm used by the VNIC of the destination tunnel endpoint; and selecting the second SPI value as the SPI value upon determining that the running resulted in the CPU core ID.

18. The computer system of claim 15, wherein the selecting the SPI value further comprises:

generating a plurality of SPI values, wherein generating the plurality of SPI values includes generating the first SPI value;

running the plurality of SPI values through the RSS hash algorithm resulting in a mapping of the plurality of SPI values to a number of CPU core IDs including the CPU core ID, wherein running the plurality of SPI values through the RSS hash algorithm includes running the first SPI value through the RSS hash algorithm, and wherein the mapping includes a mapping of the first SPI value to the CPU core ID; and selecting the SPI value corresponding to the CPU core ID based on the mapping, wherein selecting the SPI value corresponding to the CPU core ID based on the mapping includes selecting the first SPI value as the SPI value upon determining that the running resulted in the CPU core ID based on the mapping of the first SPI value to the CPU core ID.

19. The computer system of claim 15, wherein the selecting the CPU core ID further comprises using a CPU selection function.

20. The computer system of claim 19, wherein the CPU selection function uses a load level of each of the plurality of virtual CPUs as input.

21. The computer system of claim 20, wherein a load level of the virtual CPU is lowest among load levels of the plurality of virtual CPUs.

* * * * *